(12) United States Patent
Memmel et al.

(10) Patent No.: US 7,987,737 B2
(45) Date of Patent: Aug. 2, 2011

(54) SENSOR HOLDER FOR A PISTON CYLINDER UNIT

(75) Inventors: Alfred Memmel, Schonungen (DE); Thomas Nowotka, Wonfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 314 days.

(21) Appl. No.: 12/231,763

(22) Filed: Sep. 5, 2008

(65) Prior Publication Data
US 2009/0064804 A1 Mar. 12, 2009

(30) Foreign Application Priority Data

Sep. 10, 2007 (DE) .......................... 10 2007 042 850
Aug. 5, 2008 (DE) .......................... 10 2008 040 983

(51) Int. Cl.
*G01N 19/00* (2006.01)

(52) U.S. Cl. ...................................................... 73/865.9
(58) Field of Classification Search ................. 73/865.9; 33/706, 708
See application file for complete search history.

(56) References Cited

U.S. PATENT DOCUMENTS

| 5,103,172 A * | 4/1992 | Stoll .............................. 324/226 |
| 5,299,489 A * | 4/1994 | Obrecht et al. .................. 92/5 R |
| 6,007,034 A * | 12/1999 | Stoll et al. .................. 248/229.1 |
| 7,204,035 B2 | 4/2007 | Hildner et al. |

FOREIGN PATENT DOCUMENTS

| DE | 196 37 296 | 3/1998 |
| DE | 10 2004 038 691 | 4/2005 |
| DE | 10 2005 063 242 | 6/2007 |

* cited by examiner

*Primary Examiner* — Hezron Williams
*Assistant Examiner* — Tamiko D Bellamy
(74) *Attorney, Agent, or Firm* — Cohen Pontani Lieberman & Pavane LLP

(57) ABSTRACT

A sensor holder for a piston-cylinder unit with a cylinder and a piston rod which is movable relative to the latter comprises a holding element which carries out a synchronous movement with respect to the piston rod and has a first position measuring device. A second position measuring device is held by a holder so as to be axially stationary with respect to the cylinder, and there is a rotationally oriented installation position between the first position measuring device and second position measuring device. The cylinder-side holder and the holding element are rotatable relative to one another, and a magnetic force acting between the holder and the holding element brings about a rotational orientation of the two position measuring devices relative to one another.

7 Claims, 1 Drawing Sheet

SENSOR HOLDER FOR A PISTON CYLINDER UNIT

BACKGROUND OF THE INVENTION

1. Field of the Invention

The invention relates to a sensor holder for a piston-cylinder unit

2. Description of the Related Art

DE 10 2004 038 691 A1 discloses a piston-cylinder unit with a path measurement system having a position measuring device on the cylinder side and a position measuring device extending on the outer side of, and axially parallel to, the piston rod, these piston measuring devices combining to form a path signal. The cylinder-side position measuring device is fixed in a cap-shaped holder having guide surfaces for the axially parallel position measuring device inside a protective tube. A rotationally oriented installation position of the protective tube relative to the cylinder and, therefore, of the two position measuring devices is achieved by means of guide surfaces. This unit has the disadvantage that the protective tube comes into frictional contact with the holder by means of the guide surfaces. Dirt and moisture can further aggravate the boundary conditions.

SUMMARY OF THE INVENTION

It is an object of the present invention to provide a holder for sensors in which there is a rotationally oriented alignment of two position measuring devices in connection with minimum frictional forces.

According to an embodiment of the invention the cylinder-side holder and the holding element are rotatable relative to one another and a magnetic force acting between the holder and the holding element brings about a rotational orientation of the two position measuring devices relative to one another.

According to one embodiment, there is no need for direct contact between the two position measuring devices and the structural component parts supporting them. The position measuring system in its entirety is oriented automatically. This principle results in simplified structural component parts and a lower friction at the piston-cylinder unit compared to the prior art.

The cylinder-side holder is preferably constructed as a ring which is rotatably supported at the cylinder. The annular shape allows complete freedom with respect to rotational orientation when mounting the holder. The cylinder-side position measuring device can then assume the defined rotational orientation even in the event of a very large rotational error.

According to one embodiment, the cylinder-side holder is supported on the lateral surface of the cylinder. The front side of the cylinder can be used, e.g., for a stop buffer.

In one embodiment, a magnet is fastened to the ring and cooperates with a magnet at the holding element of the first position measuring device. The use of magnets dispenses with the need for cable connections and results in structural component parts which are easier to handle. In one embodiment, the magnets are permanent magnets.

To avoid possible disruptions in the entire position measuring system, the two magnets are oriented to the region of the cylinder-side holder located opposite from the position measuring devices.

The holder preferably has a bearing ring which is fixed on the cylinder side and on which is arranged a rotary ring carrying the second position measuring device that optimize the rotational function of the holder. Any irregularities that may exist in the cylinder surface will not impair the bearing quality of the rotary ring. In one embodiment, the bearing ring is made of a low-friction plastic.

The bearing ring is preferably connected directly to the cylinder. However, for technical reasons relating to manufacture it is better when the bearing ring is held axially with respect to the cylinder by a retaining ring.

In another embodiment of the invention, the holding element for the first position measuring device is formed by a protective tube for the piston rod, wherein the holding element is outfitted with a metal strip acting as a magnet which is oriented in the travel direction of the piston rod. The metal strip causes the two position measuring devices to be aligned in a rotationally oriented manner over the entire travel of the piston rod.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
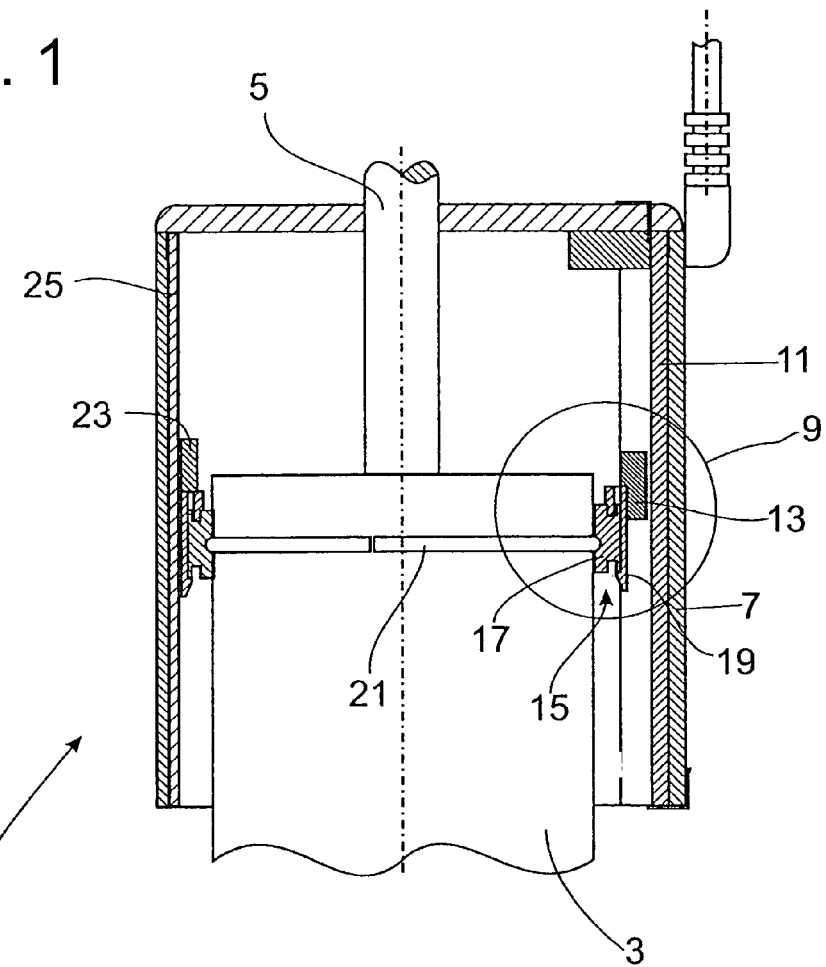
FIG. 1 depicts a longitudinal section through a position measuring system for a piston-cylinder unit according to one embodiment of the invention.
Figure 2:
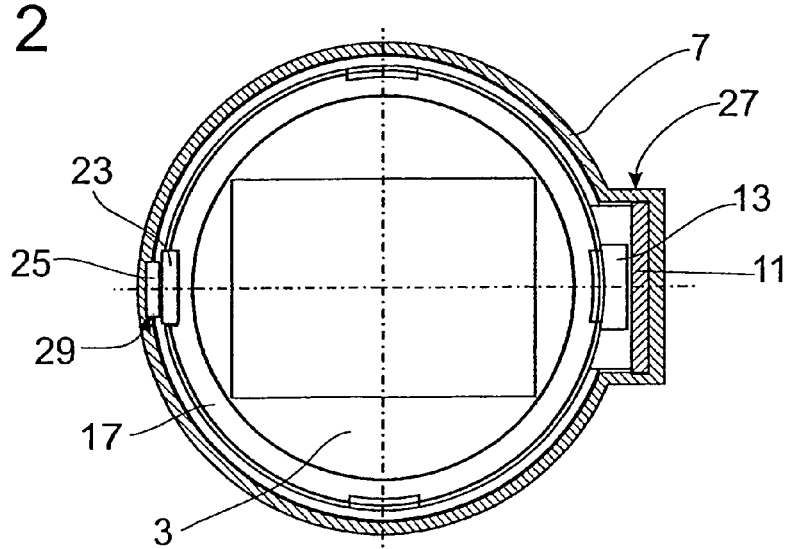
FIG. 2 depicts a cross section through a piston-cylinder unit according to FIG. 1.

FIGS. 1 and 2, viewed in conjunction, show a section of a piston-cylinder unit 1 having a cylinder 3 in which a piston rod 5 is guided so as to be movable axially. The piston rod 5 is enclosed by a protective tube 7 which executes a movement synchronous with the piston rod.

The piston-cylinder unit 1 is outfitted with a position measuring system 9 comprising two position measuring devices 11 and 13 which are movable axially with respect to one another. A first position measuring device 11 is fixed to the protective tube 7 as holding element. A holder 15 for a second position measuring device is fastened to the cylinder 3 precisely at the lateral surface of the cylinder 3. The holder 15 is preferably constructed as a ring that is rotatably supported at the cylinder 3 and has a bearing ring 17 fixed on the cylinder. A rotary ring 19 carrying the second position measuring device 13 is arranged on holder 15. The bearing ring 17 in turn is held axially with respect to the cylinder 3 by a retaining ring 21. The bearing ring is preferably made of a friction-optimized plastic, e.g., polyoxymethylene (POM). Dimensional and geometric deviations in the cylinder 3 are compensated for by this indirect mounting of the rotary ring 19.

A magnet 23 is fastened to the rotary ring 19 and cooperates with a magnet 25 of the first position measuring device 11 or the protective tube 7. The magnet 23 is oriented to the region of the cylinder-side holder or rotary ring 19 located opposite the position measuring devices in order to achieve a maximum distance from the position measuring devices 11 and 13. As can be seen from FIG. 1, the magnet 25 fastened to the protective tube 7 is preferably formed by a metal strip which has magnetic properties and is oriented in the travel direction of the piston rod 5.

During assembly, the piston-cylinder unit 1 is outfitted with the retaining ring 21. Next, the bearing ring 17 is snapped onto the retaining ring 21. The bearing ring 17 preferably already carries the rotary ring 19 with the second position measuring device 13 and the magnet 23. A rough rotational orientation of the rotary ring 19 is required only when there is a small radial distance between the protective tube 7 and the cylinder 3.

In one embodiment, the protective tube 7 has a groove-shaped receptacle 27 for the first strip-shaped position measuring device 11. The magnetic metal strip 25 is preferably fitted at a predetermined location before mounting the protective tube 7. FIG. 2 shows that a receptacle groove 29 is also provided in the protective tube 7 for the magnet 25. After protective tube 7 with the first position measuring device 11 is fitted to the cylinder 3, the two oppositely polarized magnets 23 and 25 come into operation. The attracting magnetic forces of magnets 23 and 25 ensure that the holder 15 with the second position measuring device 13 is rotationally oriented with respect to the protective tube 7, while making use of the rotatability of the cylinder-side holder 15 with respect to the first position measuring device 11, which is held by the protective tube 7. There is preferably no contact between the holder 15 and the protective tube 7.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A sensor for a piston-cylinder unit with a cylinder and a piston rod which is movable relative to the latter, the sensor comprising:
   a holding element adapted to move in synchronization with the piston rod;
   a first position measuring device coupled to the holding element;
   a cylinder side holder coupled to the cylinder and adapted to be axially stationary with respect to the cylinder; and
   a second position measuring device coupled to the cylinder side holder, wherein the second measuring device and the holding element are rotatable relative to one another and a magnetic force brings about a rotational orientation of the first and second position measuring devices relative to one another, wherein the cylinder-side holder is constructed as a ring which is rotatably supported at the cylinder.

2. The sensor holder according to claim 1, wherein the cylinder-side holder is supported on the lateral surface of the cylinder.

3. The sensor holder according to claim 1, further comprising a first magnet fastened to the ring and cooperating with a second magnet at the holding element of the first position measuring device.

4. The sensor holder according to claim 3, wherein the first and second magnets are oriented to the region of the cylinder-side holder located opposite from the first and second position measuring devices.

5. The sensor holder according to claim 1, wherein the holder has a bearing ring fixed relative to the cylinder wherein a rotary ring carrying the second position measuring device is arranged on the bearing ring.

6. The sensor holder according to claim 5, wherein the bearing ring is held axially with respect to the cylinder by a retaining ring.

7. The sensor holder according to claim 1, wherein the holding element for the first position measuring device is formed by a protective tube for the piston rod, wherein the holding element is outfitted with a metal strip acting as a magnet and oriented in a travel direction of the piston rod.

* * * * *